(No Model.)

2 Sheets—Sheet 1.

G. W. WHITSON.
SELF LOADING EXCAVATING CART.

No. 258,269.

Patented May 23, 1882.

WITNESSES

INVENTOR
George W. Whitson
Attorney (No Model.)
G. W. WHITSON.
SELF LOADING EXCAVATING CART.
No. 258,269.   Patented May 23, 1882.
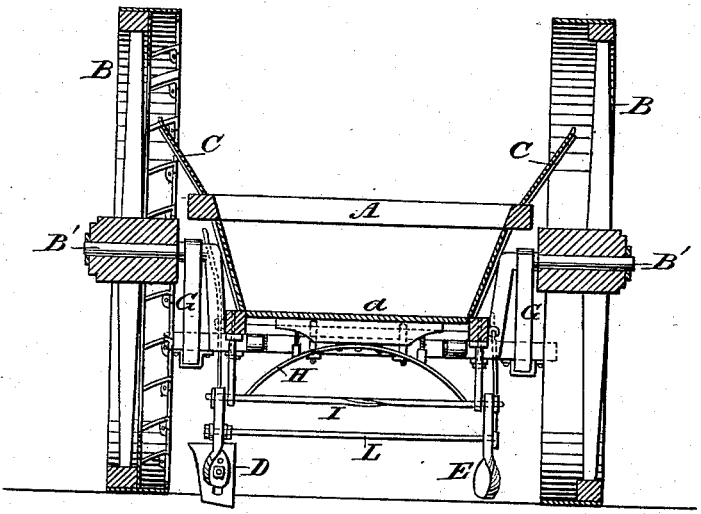
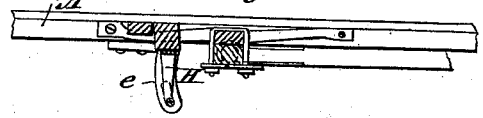
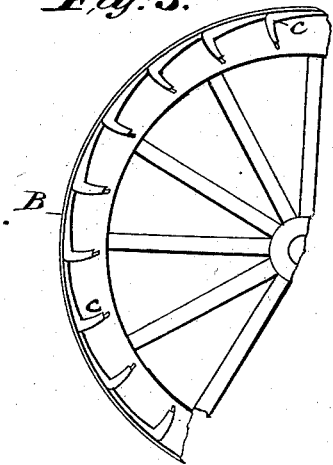
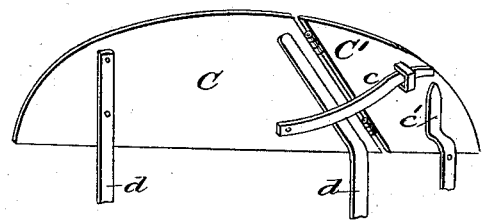
WITNESSES
INVENTOR
George W. Whitson
By Robt. B. Vance
Attorney

UNITED STATES PATENT OFFICE.

GEORGE W. WHITSON, OF ASHEVILLE, NORTH CAROLINA.

SELF-LOADING EXCAVATING-CART.

SPECIFICATION forming part of Letters Patent No. 258,269, dated May 23, 1882.

Application filed February 28, 1882. (No model.)

*To all whom it may concern:*

Be it known that I, GEORGE W. WHITSON, of Asheville, in the county of Buncombe and State of North Carolina, have invented certain new and useful Improvements in Self-Loading Excavating-Carts; and I do hereby declare that the following is a full, clear, and exact description thereof, which will enable others skilled in the art to make and use the same, reference being had to the accompanying drawings, forming part of this specification, and in which—

Figure 1:
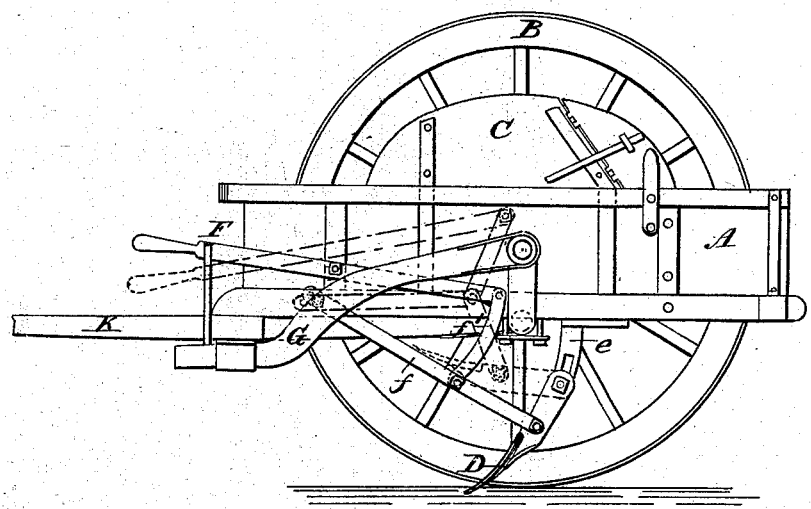
Figure 2:
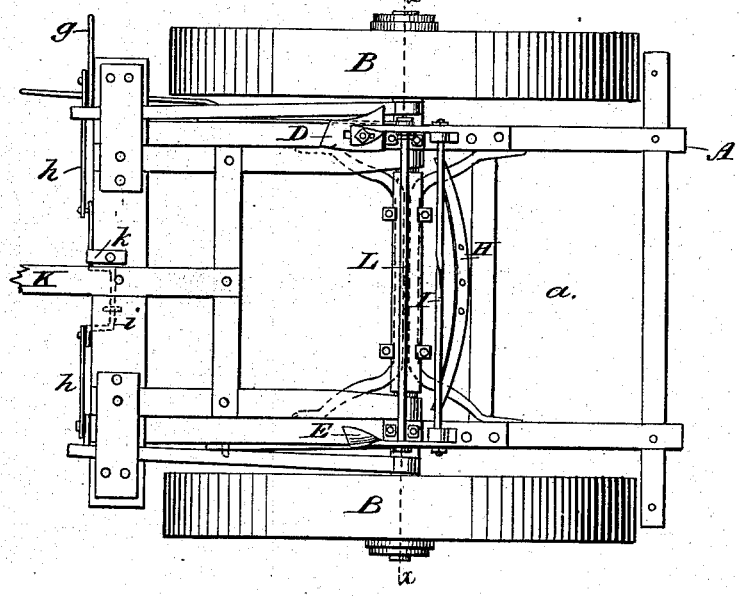
Figure 3:
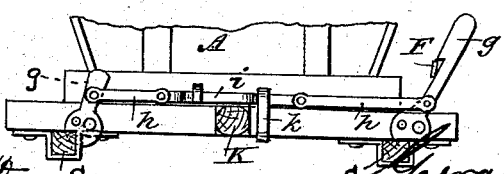

Figure 1 is a side elevation with one wheel removed. Fig. 2 is a bottom view of the cart. Fig. 3 is a vertical section on line $x\ x$ of Fig. 2. Fig. 4 is a detail view of the dumping-gear. Fig. 5 is a side view of a section of one of the wheels. Fig. 6 shows details of the scoops. Fig. 7 is a perspective view of the side or guide boards with hinged spring part. Fig. 8 is a detail front view, showing the tripping-levers.

Similar letters of reference indicate corresponding parts.

My invention relates to certain improvements in an excavating-cart patented to me July 21, 1868, numbered 80,259; and they consist in new mechanism for locking the false shafts; for allowing the plows to rise from the ground when they meet any obstruction; for keeping the plows from catching in the wheels; in a modified form of bucket or scoop; a novel form of shield or guide-board, and certain other details, as will be fully hereinafter described.

As the general construction of the cart for loosening the earth, lifting it into the cart by means of buckets or scoops on the wheels, and dumping the load is substantially the same as in my former patent before referred to, it need not here be minutely described.

A is the body of the cart.

B B are the wheels, which revolve on the axles B' B' and discharge the earth into the body A. The wheels are made with broad tires, which project inwardly; and the fellies are also made wide, or, if made narrow, are widened by securing on the inner side thereof an annular piece of suitable sheet metal. In the recess formed by the projecting or overhanging tires are placed a series of buckets or scoops, $b$ or $b'$, (shown in Fig. 6,) which are securely attached to the sides of the fellies and also to the tires, and as the wheels revolve raise the earth and discharge it into the cart. In this instance the buckets are not only secured in angular positions, but the buckets themselves are angular in form, and are made higher next the fellies—that is to say, the side or flange of the bucket increases in height from its inner portion toward the felly of the wheel—thus enabling them to carry more earth. I prefer to use the bucket $b'$, which consists of two pieces of metal. The front piece is cut from a flat piece of metal, of the form shown, and provided with a flange or lip to receive the blade, which is made with a corresponding lip. The inner end of the blade is provided with a right-angled perforated flange for securing it to the felly, and the front part is also provided with a flange, by means of which it is bolted or riveted to the tire. By this construction I obtain a very strong and durable bucket, and one that is easily repaired.

C is a shield or guide board, one of which is provided on each side of the cart, and which are attached to the side-board of the cart-body by suitable braces, $d\ d$. The shield C consists of two parts, C and C', the latter being hinged or pivoted to the former, and a spring, $c$, secured to the part C, plays through a loop or slot on the part C', as shown in Fig. 7. An additional spring, $c'$, is attached to the body of the cart, and its free end rests against the hinged part C'. The object of this hinged section held in place by the springs is to allow any hard material that may be carried above the buckets to pass the shield or guide without injury to it and drop out.

D E are the plows, which are similar to those in my former patent, excepting that the share is slotted, as shown in Fig. 2, so that they may be readily adjusted by means of a bolt and nut to vary their depth. They are adjustably pivoted to slotted arms or brackets $e$ depending from the under side of the cart-body, and are connected by the twisted-steel axle I and the brace L. (Plainly shown in Fig. 3.) The axle I is made of steel twisted in the center, and with spring temper, so that if a link or bolt which supports the plows should break while in action no damage would occur to the axle on account of its torsional properties. The object of the rod or brace L is to keep the plows, while in operation, from inclining toward or into the wheels.

f f' are links or levers for raising or lowering the plows by means of the lever F. The lever f consists of a single bar attached at one end to the lower front portion of the cart-body and pivoted at the other end to a bifurcated link, the latter being attached to the standard or support to which the share is attached. The link or lever f' is pivoted to the lever f and the inner end of the operating-lever F. It will be apparent that any movement of the lever F raises or lowers both plows simultaneously by reason of their being connected by the axle I and rod or brace L.

A bent spring, H, has its convex portion attached to the bottom of the cart-body, or to a suitable bracket thereon, and the free ends of said spring rest on the axle I and press it down in the slots in the brackets e, so as to allow the plows to rise out of the ground when they meet too great resistance from any hard material. For the purpose of increasing or diminishing the power of the spring, I provide temper-screws either in the bracket or on the bottom of the cart-body, so that they may be forced down upon the spring at each end, if desired.

G are false shafts, which are similar to those shown in my former patent; but, instead of being operated independently, I have provided mechanism for operating both by a single lever, which I will now proceed to describe. In the front of the cart-body is a cross-bar, to which the body is detachably secured, so that the load may be conveniently dumped when desired. A tongue, K, or shafts if desired, may be attached to this cross-bar. The front ends of the false shafts or pivoted arms G rest in cleats or brackets on the under side of the front cross-bar, and are locked in position by means of levers g, one on each side. The lower ends of the levers are cam-shaped, so that by their being turned in one direction or the other they will either lock or release the false shafts G. The levers g g are connected by means of the straight links or bars h h and the bent link i. The links h h are pivoted at one end to each of the levers, respectively, and at the other to the bent link i. The latter is held in position by and adapted to slide through a loop or eye on the top of the cross-bar, and also through a second loop or eye, k, on the side of the cross-bar. The handle of one of the levers is extended, so that it may be easily grasped by the hand, and it will be understood that any movement of this lever will lock or release both false shafts G, as clearly shown in Fig. 8. The long-handled lever just described is also provided with one or more notches, after the form of a ratchet-bar, so that the lever F, which raises and lowers the plows, may be engaged therewith, and the plows are thus held elevated whenever it may be desirable.

On the upper side of the bent bar, upon the ends of which the axles B' B' are formed, I have provided an additional or strengthening bar. (Shown in full and dotted lines in Fig. 2.) This bar is bifurcated or forked at the ends, and is both bolted to the frame-work or body of the cart and secured to the bent axle-bar by means of cleats or clamping devices, and it gives additional strength to the axle and renders the cart more firm and substantial.

Having thus fully described my improvement, what I claim as new, and desire to secure by Letters Patent, is—

1. In a self-loading excavating-cart, the angular-shaped buckets for the wheels formed highest next the felly, substantially as set forth.

2. In a self-loading excavating-cart, the buckets b', formed of two angular-shaped pieces of metal, having coincident lips or flanges and adapted to be secured to the felly and tire of the wheel, substantially as set forth.

3. In a self-loading excavating-cart, the combination of the cam-levers g, the cross-bar, the false shafts, and the links h h and i, substantially as set forth.

4. In a self-loading excavating-cart, the combination of the cam-lever g, provided with a notch or notches in its handle, the lever F, plow D, and intermediate links, f f', substantially as set forth.

5. In a self-loading excavating-cart, the combination of the twisted torsional axle I, the brackets e, and plows, substantially as set forth.

6. In a self-loading excavating-cart, the combination of the axle I, the bent spring H, slotted brackets e, and plows, substantially as set forth.

7. In a self-loading excavating-cart, the combination of the axle I, the bent spring H, temper-screws, slotted brackets e, and plows, substantially as set forth.

8. In a self-loading excavating-cart, a shield or guide consisting of a rigid and a hinged section, substantially as set forth.

9. In a self-loading excavating-cart, the shield or guide consisting of the rigid part C and the hinged section C', in combination with the springs c and c', substantially as set forth.

10. In a self-loading excavating-cart, the supplemental bar, having bifurcated or forked ends bolted to the cart-body and cleats to secure it to the bent axle-bar, substantially as set forth.

In testimony whereof I affix my signature in presence of two witnesses.

GEORGE W. WHITSON.

Witnesses:
JAMES R. PATTERSON,
WALTER G. CUSHMAN.